(12) United States Patent
Chandranmenon et al.

(10) Patent No.: US 9,462,069 B2
(45) Date of Patent: Oct. 4, 2016

(54) PRESENCE MANAGEMENT PROXYING METHODS AND DEVICES

(75) Inventors: Girish P. Chandranmenon, Edison, NJ (US); Fang Hao, Morganville, NJ (US); Scott C. Miller, Freehold, NJ (US); Sarit Mukherjee, Morganville, NJ (US); Tejas Naik, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1355 days.

(21) Appl. No.: 11/393,885

(22) Filed: Mar. 31, 2006

(65) Prior Publication Data

US 2007/0236719 A1   Oct. 11, 2007

(51) Int. Cl.
*H04L 29/08* (2006.01)
*A63F 13/30* (2014.01)
*A63F 13/358* (2014.01)
*H04L 29/06* (2006.01)

(52) U.S. Cl.
CPC ............. *H04L 67/24* (2013.01); *A63F 13/12* (2013.01); *A63F 13/358* (2014.09); *H04L 67/38* (2013.01); *A63F 2300/534* (2013.01); *A63F 2300/535* (2013.01)

(58) Field of Classification Search
CPC ....... H04L 67/24; H04L 67/38; A63F 13/12; A63F 13/358; A63F 2300/534; A63F 2300/535
USPC ........................................................ 709/227
See application file for complete search history.

(56) References Cited

U.S. PATENT DOCUMENTS

| | | | | |
|---|---|---|---|---|
| 5,830,067 | A  * | 11/1998 | Graves et al. | 463/40 |
| 7,124,123 | B1 * | 10/2006 | Roskind et al. | 709/205 |
| 7,240,093 | B1 * | 7/2007 | Danieli et al. | 709/205 |
| 8,108,516 | B2 * | 1/2012 | Zmolek | 709/224 |
| 8,315,651 | B2 * | 11/2012 | Fok | 455/466 |
| 8,376,855 | B2 * | 2/2013 | Lockton et al. | 463/40 |
| 2003/0065788 | A1 * | 4/2003 | Salomaki | 709/227 |
| 2004/0059781 | A1 * | 3/2004 | Yoakum et al. | 709/206 |
| 2004/0148237 | A1 * | 7/2004 | Bittmann et al. | 705/35 |
| 2004/0162881 | A1 * | 8/2004 | Digate et al. | 709/206 |
| 2005/0034147 | A1 * | 2/2005 | Best, Jr. | H04L 67/306 725/10 |
| 2005/0071433 | A1 * | 3/2005 | Shah | 709/207 |
| 2005/0239550 | A1 * | 10/2005 | Hardisty et al. | 463/42 |
| 2006/0117050 | A1 * | 6/2006 | John et al. | 707/101 |
| 2006/0259623 | A1 * | 11/2006 | Crawford et al. | 709/226 |

* cited by examiner

*Primary Examiner* — Patrice Winder
(74) *Attorney, Agent, or Firm* — Capitol Patent & Trademark Law Firm, PLLC

(57) ABSTRACT

A network comprises agents which act as proxies on behalf of devices, such as wireless game devices, phones and personal digital assistants. Each agent collects information concerning a "presence status" of a device. An agent determines whether to forward messages on to a device depending on the collected presence status (e.g., active/inactive) of the device. For example, if the presence status indicates the device is active then messages will be forwarded. If, however, the status indicates the device is inactive the message will not be forwarded. Instead, the agent may act as a proxy for the device while it is inactive. By only forwarding messages when a device is active, valuable airlink time and/or bandwidth can be conserved.

20 Claims, 2 Drawing Sheets

PRESENCE MANAGEMENT PROXYING METHODS AND DEVICES

BACKGROUND OF THE INVENTION

In the not too distant future, telecommunications service providers plan to provide so called "seamless" services. For a service to function seamlessly, it will have to provide users with the perception that they are always connected on, or to, a network. Such an "always-on" service should provide users with the impression that the time required to launch an application (e.g., a game) and carry out a communication session is minimal.

Co-Pending U.S. patent application Ser. No. 11/393,900, incorporated by reference in full herein as if set forth in full herein, describes an "always on" architecture. As set forth in co-pending U.S. patent application Ser. No. 11/393,900, such an architecture enables a service provider to provide always on, seamless services.

In co-pending U.S. patent application Ser. No. 11/393,886, also incorporated by reference herein in full as if set forth in full herein, a so-called "one-touch" device is discussed.

One component of the always-on architecture and one device that works with a one-touch device is known as an "agent". While some of the features and functions provided by an agent are discussed in the co-pending Applications mentioned above, the discussion which follows provides a more detailed discussion of the "presence management" features/functions of an agent as well as a discussion of other features/functions.

SUMMARY OF THE INVENTION

In accordance with the present invention, an agent may collect information concerning a "presence status" of a device, even when the device is inactive. The agent determines whether to forward messages on to the device depending on the collected presence status (e.g., active/inactive) of the device. For example, if the presence status indicates the device is active then messages will be forwarded. If, however, the status indicates the device is inactive the message will not be forwarded. Instead, the agent may act as a proxy for the device while it is inactive. By only forwarding messages when the device is active, valuable airlink time and/or bandwidth may be conserved.

DETAILED DESCRIPTION OF THE INVENTION, WITH EXAMPLES

In accordance with one embodiment of the present invention, an always-on agent (referred to as an "agent" for short) is operable to "proxy" the presence of a device. That is to say an agent is continuously collecting information concerning the presence status of a device, and, thereafter, determining what actions (if any) to take on behalf of the device and its associated user. As described further below, the agent may collect this status information and act on behalf of the device if even when the device is powered off or its user is inattentive (i.e., in an inactive state).

Figure 1:
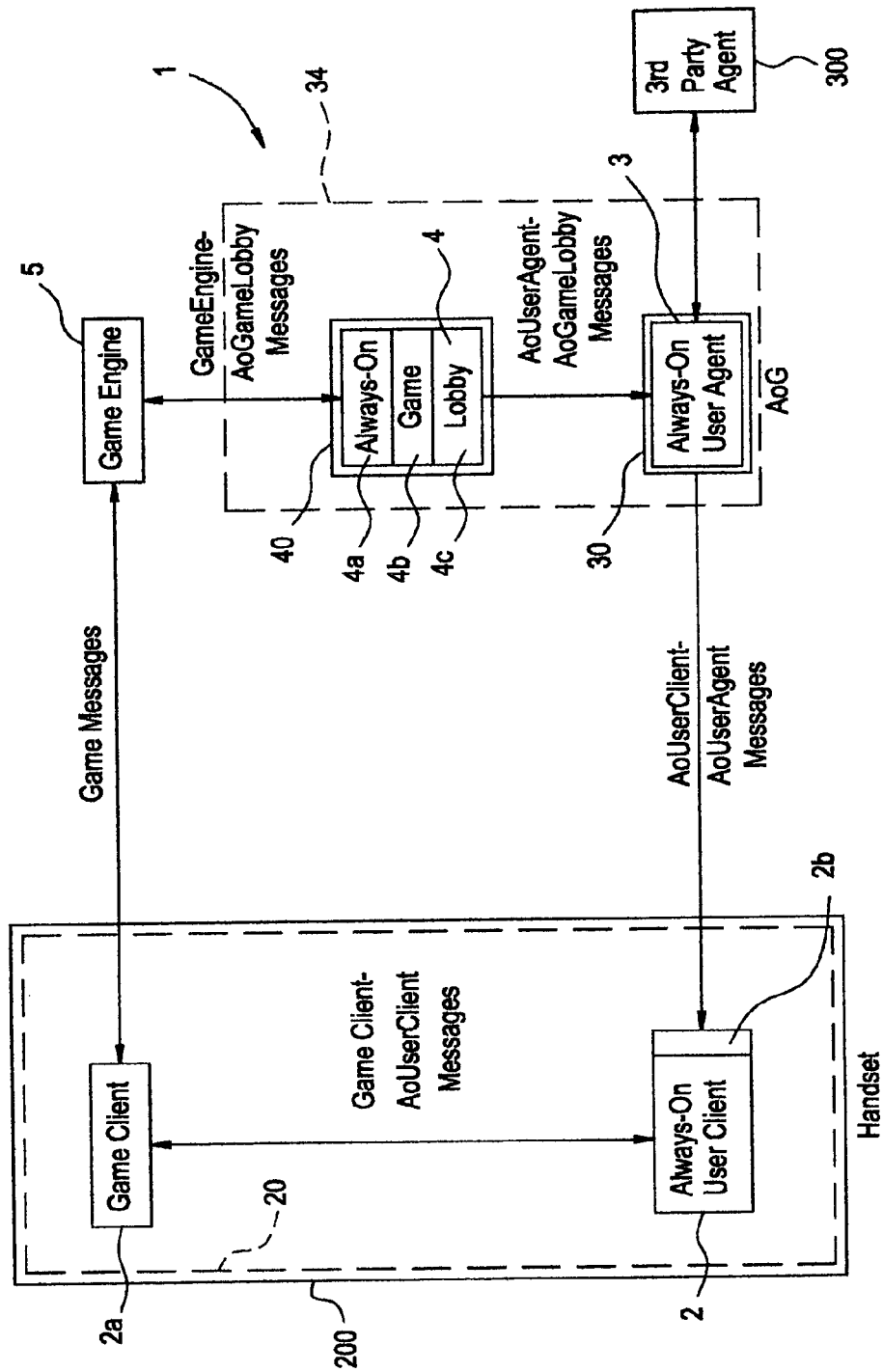
FIG. 1 depicts an illustration of an architecture which may be used to provide always-on or always-connected seamless services according to embodiments of the present invention.

Referring now to FIG. 1, there is shown one example of an always-on architecture. As shown, always-on architecture 1 includes at least one "always on" client 2 and applications client 2a, at least one "always on" agent 3, and at least one "always on" lobby 4. Also shown are at least one game server 5 and at least one other third party agent 300. Further details of the architecture 1 are set forth in the co-pending Applications mentioned above.

Before going further, it should be understood that the client 2 and applications client 2a may comprise one or more software or firmware programs/applications that may be co-located and stored on a computer readable medium 20 of some sort (e.g., compact disc, hard drive, memory, memory and processor) which may be, in turn, be embedded within a larger device 200, such as a wired or wireless telephone, personal digital assistant (PDA), computer, gaming device, or a device which combines one or more functions (e.g., email and voice messaging), etc. . . . . Alternatively, the client 2 and applications client 2a may be stored on more than one medium or stored on separate mediums which may or may not be co-located. Likewise, the agent 3 and lobby 4 may also comprise one or more programs/applications and may also be stored on one or more computer readable mediums 30, 40, respectively, that are also part of one or more larger devices, such as a server 34. When stored on a computer readable medium as one or more programs/applications, the components shown in FIG. 1 may comprise code that is operable to control the features and functions of the component, etc. . . . .

As mentioned above, an agent, such as agent 3, may be operable to collect information regarding the presence status of the device 200 and its user. For example, if the user has powered off the device 200 then the agent 3 will detect that the device 200 as well as the user are in an "inactive" state. Subsequently, if and when the user powers the device 200 back on again, the agent 3 will detect that the user and the device 200 are now in an "active" state.

Because the agent 3 may be continuously collecting information regarding the presence status of the device 200, it may be able to quickly respond on behalf of the user when the device 200 is in active state or in an inactive state as described further below.

For example, when another user forwards an information message intended for the user of device 200, such a message may be detected by the agent 3 before arriving at the device 200. If the agent 3 has detected that the device 200 is powered on and the user is otherwise in an active state, it will allow the message to be forwarded on to the device 200. If, however, the agent 3 determines that the device 200 is powered off or the user is otherwise in an inactive state, the agent 3 may decline to forward such a message on to the device 200 and, instead, generate a "user/device unavailable" message on behalf of the inactive device 200, for example, which it sends to the agent of the user that sent the original message. In this sense, the agent 3 can be said to have acted as a proxy for the device 200.

The ability to detect the presence status of a user or device has many advantages. Because information messages are only sent by an agent when its associated device and user are in an active state valuable airlink time and/or bandwidth is conserved. In more detail, in existing network architectures (i.e., those that do not use the present invention), prior to sending an information message to the device 200, a signaling message is typically sent. This signaling message verifies whether the device 200 is powered on and/or whether the user is active or inactive (e.g., available or unavailable). The signaling message in essence verifies that a link can be established between the calling party and the destination party. If a link can be established then the information message can be sent. In such a scenario, however, signaling messages are always sent even if the device 200 or user are inactive. In the case where the device is powered down or the user is inattentive (i.e., inactive), the signaling message will indicate that a link cannot be set up. Nonetheless, the existing network has used valuable airlink time and/or bandwidth to send the signaling messages. In contrast, the present invention conserves airlink time and/or bandwidth because neither signaling nor information messages are sent unless the device and/or its user is active. In essence, the agent 3 may act as a filter or screen, only allowing messages to be sent to the device 200 if the device 200 and user are active. Again, this significantly conserves the amount of airlink time and bandwidth needed by a network.

A set forth in co-pending U.S. patent application Ser. No. 11/393,900, incorporated herein in full as if set forth in full herein, the device 200 and agent 3 may exchange periodic messages related to the presence status of the device 200. It is through the periodic exchange of these messages that the agent 3 receives the current presence status of the device 200. The bandwidth and airlink time used by these messages, however, is far less than that used by typical signaling messages and protocols.

In accordance with yet another embodiment of the present invention, the periodic messages and any information and/or signaling messages that need to be exchanged between the agent 3 and device 200 may be sent using a short binary message format. By using such a format, airlink time and/or bandwidth may be further conserved.

It should be understood that messages may be exchanged between the agent 3 and device 200 using wired or wireless technology. That is, the device 200 and/or agent 3 (as well as the other components shown in FIG. 1) may be part of a wired or a wireless device.

Some examples of a presence status have been discussed above. In yet further embodiments of the invention, a presence status may indicate whether or not the user of the device 200 is available to play an on-line game or carry out another type of application. For example, though the device 200 may be powered on its user may not desire to play a game. This is also considered another inactive state which is collected and/or detected by the agent 3.

In accordance with yet another embodiment of the present invention, each device 200 may be assigned a single agent 3. As described in more detail in the co-pending patent Applications mentioned above, the agent 3 and/or lobby 4 may be operable to collect and/or receive information related to the preferences and habits of usage of the user of device 200. From this information, the agent 3 and/or lobby 4 may be operable to identify patterns and develop profiles for the user/device 200. One such profile may consist of the games played most often by the user of device 200. Another profile may consist of those third party users the user communicates with most often (e.g., plays games with most often). Again, the co-pending Applications mentioned above include further details and examples of the type of information which may be collected and the types of profiles that may be created. Based on these profiles, etc. . . . an agent may act as a proxy for its associated device/user even when the device/user are inactive or become inactive. For example, if during a session the user decides to power off her device or leave a game the agent may still act on behalf of the user and respond to game signals.

Up until now, we have focused on the presence status of the device 200. In accordance with further embodiments of the present invention, the agent 3 may also be operable to collect and/or receive the presence status of one or more other third party users/devices (not shown in FIG. 1) even when the device 200 is inactive. In accordance with still additional embodiments of the present invention, the agent 3 may collect this status information or receive it from agents associated with the other devices, such as third party agent 300 shown in FIG. 1. Thereafter, the collected presence status of these other users/devices may be forwarded on to the device 200 (provided the user/device becomes active). This feature may be used to create icons that, when selected, provide the user with "one touch" access to her favorite "buddies" that are presently available to play an on-line game, for example.

In accordance with additional embodiments of the invention, each agent within a network, such as network 1, may be operable to carry out the features and functions described above. Thus, if agent 300 has stored the presence status of its associated device (not shown in FIG. 1), then upon receipt of an information message intended for its associated device from device 200 (via agent 3) agent 300 may be operable to determine whether or not to forward this information on. As before, if the presence status indicates an active status the agent 300 may allow the message to be forwarded on. If the presence status indicates an inactive status, then the agent 300 may act as a proxy on behalf of its associated device/user and decline to forward the message on, and, instead forward a "user/device unavailable" message etc., back to agent 3/device 200. As before, this screening or filtering of messages based on the presence status of a user/device helps to conserve bandwidth and airlink time.

As briefly mentioned above, agents may exchange messages. In accordance with additional embodiments of the present invention, the exchange of messages may occur without prompting by a user. That is, agents may be operable to exchange presence information, profiles as well as other information associated with their respective devices/users even if their devices/users are inactive. That said, in alternative embodiments of the present invention exchanges may be limited to only those agents whose users have subscribed to a given service. For example, suppose the users associated with agents 3 and 300 have subscribed to the same on-line gaming service. Because both users have subscribed, their agents are authorized to exchange messages.

Figure 2:
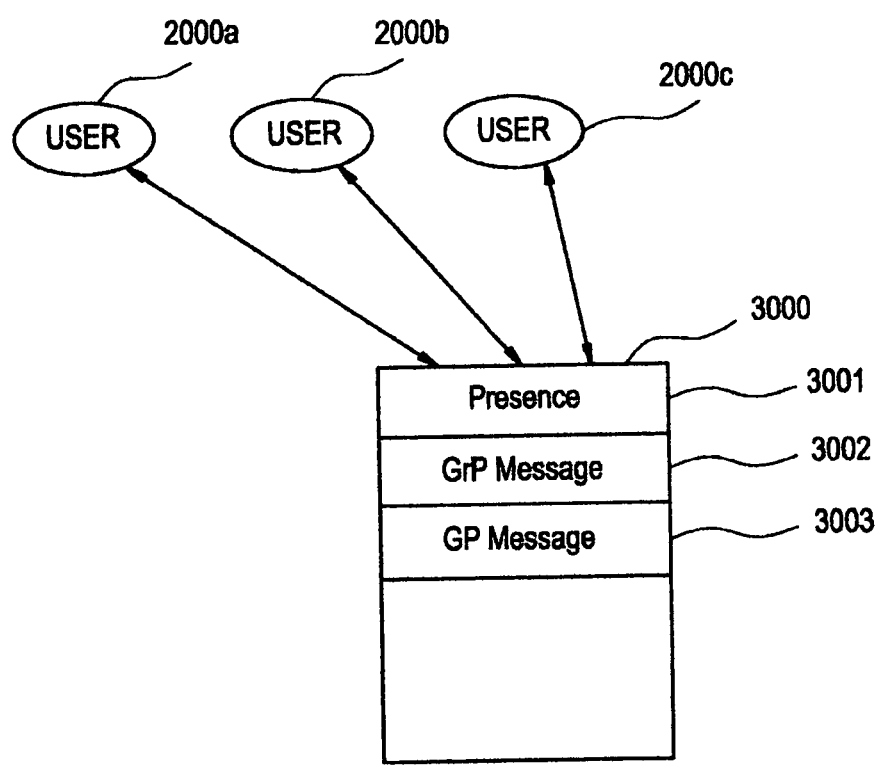
FIG. 2 depicts an example of an always-on agent according to an embodiment of the present invention.

Up to now, we have discussed the agent 3 as if it consisted of a single component. However, in accordance with alternative embodiments of the present invention the agent 3 may comprise multiple components. FIG. 2 depicts one example of an agent 3000 that comprises three components (i.e., modules or sub-components): a buddy presence message module 3001, a group messaging module 3002, and a general purpose messaging module 3003.

In accordance with the present invention, module 3001 is operable to send and receive presence status information to/from devices 2000a, 2000b, and 2000c, for example. That is, this module is operable to store the presence status of an associated device and to receive the presence status of other devices from their respective agents. As described above, this becomes useful when each of the devices involved have subscribed to a particular service.

The group messaging module 3002 and the general purpose messaging module 3003 are operable to exchange group messages or general purpose communications, respectively, between themselves and similar modules within other agents.

In a further embodiment of the present invention, module 3001 may create, store and update a so-called "Everybuddy list". Such a list may contain an entry for all of the buddies of a particular user and the lobby they are associated with, such as lobby 4. Further, agent 3000 may create, store and update a list of buddies or individuals who have subscribed to receive the presence status of a particular user/device 2000a-c. In accordance with the present invention, each entry in such a list may include a user name (e.g., a unique ID), and user's lobby address, among other information.

In a further embodiment of the invention, each entry in the subscribed list may also include the agent that has subscribed to receive the user's presence status information.

We now present one example of how the presence status of a given user, which may be stored in an Everybuddy list, may be retrieved. The agent 3000 (or 3) may be operable to retrieve a user's presence status from a look-up table or the like upon receiving a user's name or unique identification (ID). Alternatively, a peer-to-peer style hashing look-up may be used. Using the latter technique the identification of each agent/lobby along with the unique ID for each associated user are mapped to a k-bit address space using an MD-5 or similar hashing scheme. Once mapped, all of the agents/lobbies form an implicit ring of k-bit identifiers. In accordance with the present invention, an agent or lobby may thereafter store look-up information about a particular user, when a user's k-bit identifier falls between the identifiers stored in a particular agent/lobby and its predecessors in the ring. A look-up entry for a given user may contain both a primary and a secondary hosting location (e.g., an address). The agent/lobby that stores this lookup entry for the user is called an "anchor" agent/lobby.

In accordance with alternative embodiments of the present invention, an agent/lobby may carry out a look-up function that maps a user's ID into a k-bit space and then queries an anchor agent/lobby in order to obtain the look-up entry which contains the agent/lobby's address.

The discussion above has presented some examples of the present invention. Other examples may occur to those skilled in the art. For example, the agents provided by the present invention may also be operable to carry out "roboting" functions, where an agent is capable of acting on behalf of its respective device to carry out steps within an on-line game while the device is active or inactive. The true scope of the present invention, however, is given by the claims which follow.

We claim:

1. A presence management proxying method comprising:
   collecting information concerning the presence status of a device;
   determining whether to forward a message relating to an on-line game to the device depending on the collected information;
   developing profiles of the user; and
   acting on behalf of the user and responding to game signals based on the profiles beginning when the presence status indicates the device is inactive.

2. The method as in claim 1 further comprising forwarding a message to the device when the presence status indicates the device is active.

3. The method as in claim 2 wherein the message is forwarded wirelessly.

4. The method as in claim 1 further comprising declining to forward a message to the device when the presence status indicates the device is inactive.

5. The method as in claim 1 further comprising forwarding a presence status of one or more other devices.

6. A presence management proxying method comprising:
   collecting information concerning a presence status of each of one or more devices;
   determining whether to forward a message relating to an on-line game on to each of the one or more devices depending on the collected information;
   developing profiles of each user; and
   acting on behalf of the user of one of the one or more devices, and responding to game signals based on the profiles of the user of the one device beginning when the presence status of the one device indicates the one device is inactive.

7. The method as in claim 6 further comprising forwarding the message on to one of the devices when the presence status of the one device indicates the one device is active.

8. The method as in claim 7 wherein the message is forwarded wirelessly.

9. The method as in claim 6 further comprising declining to forward the message on to one of the devices when the presence status of the one device indicates the one device is inactive.

10. A presence management proxying method comprising:
    exchanging presence status information between two or more agents, wherein the information is related to a device involved in an on-line game associated with one of the agents,
    developing profiles of the user; and
    acting on behalf of the user and responding to game signals based on the profiles beginning when the presence status indicates the device is inactive.

11. A presence management proxying device operable to:
    collect information concerning the presence status of a user device;
    determine whether to forward a message relating to an on-line game to the user device depending on the collected information; and
    develop profiles of the user; and
    act on behalf of the user and respond to game signals based on the profiles beginning when the presence status indicates the user device is inactive.

12. The presence management proxying device as in claim 11 further comprising forwarding a message to the user device when the presence status indicates the user device is active.

13. The presence management proxying device as in claim 12 further operable to forward the message wirelessly.

14. The presence management proxying device as in claim 11 further operable to decline to forward a message to the user device when the presence status indicates the user device is inactive.

15. The presence management proxying device as in claim 11 further operable to forward a presence status of one or more other devices.

16. The presence management proxying device as in claim 11 further operable to:
    collect information concerning a presence status of a plurality of devices; and
    determine whether to forward a message relating to an on-line game on to each of the plurality of devices depending on the collected information from the plurality of devices.

17. The presence management proxying device as in claim 16 further operable to forward the message on to one of the plurality of devices when the presence status of the one device indicates the one device is active.

18. The presence management proxying device as in claim 16 further operable to decline to forward the message on to one of the plurality of devices when the presence status of the one device indicates the one device is inactive.

19. The presence management proxying device as in claim 17 further operable to forward the message wirelessly.

20. A presence management proxying agent stored on a computer readable medium operable to:
   exchange presence status information with at least one other proxying agent, wherein the information is related to a device involved in an on-line game associated with one of the agents;
   develop profiles of the user; and
   act on behalf of the user and respond to game signals based on the profiles beginning when the presence status indicates the device is inactive.

* * * * *